United States Patent
Derby et al.

(10) Patent No.: US 9,399,529 B2
(45) Date of Patent: Jul. 26, 2016

(54) AUTOMATED PRODUCT ENGAGER, TRANSPORTER AND PATTERENED DEPOSITOR SYSTEM

(75) Inventors: Stephen Derby, Troy, NY (US); John McFadden, Fairlee, VT (US); David Brown, Pittsford, NY (US); Eugene Eckert, Hamburg, NJ (US)

(73) Assignee: PACK FLOW CONCEPTS LLC, Pittsford, NY (US)

( * ) Notice: Subject to any disclaimer, the term of this patent is extended or adjusted under 35 U.S.C. 154(b) by 646 days.

(21) Appl. No.: 13/810,620

(22) PCT Filed: Aug. 9, 2011

(86) PCT No.: PCT/US2011/047051
§ 371 (c)(1),
(2), (4) Date: Jan. 16, 2013

(87) PCT Pub. No.: WO2012/021495
PCT Pub. Date: Feb. 16, 2012

(65) Prior Publication Data
US 2013/0152511 A1  Jun. 20, 2013

Related U.S. Application Data

(60) Provisional application No. 61/401,203, filed on Aug. 9, 2010.

(51) Int. Cl.
*B65B 5/08* (2006.01)
*B65B 35/24* (2006.01)
*B65G 47/26* (2006.01)
(Continued)

(52) U.S. Cl.
CPC . *B65B 3/00* (2013.01); *B65B 5/105* (2013.01); *B65B 35/246* (2013.01); *B65B 61/28* (2013.01); *B65G 15/44* (2013.01); *B65G 47/5118* (2013.01); *B65G 47/52* (2013.01); *B65B 2220/18* (2013.01)

(58) Field of Classification Search
CPC ........ B65B 35/50; B65B 43/54; B65B 35/44; B65B 35/24; B65B 2220/22; B65B 31/021; B65B 61/04
USPC ............................ 53/542, 543, 443, 475, 251
See application file for complete search history.

(56) References Cited

U.S. PATENT DOCUMENTS 3,314,213 A * 4/1967 Peppler .................... B65B 5/12
53/246
3,377,774 A * 4/1968 Nigrelli .................... B65B 5/08
53/244

(Continued)

*Primary Examiner* — Andrew M Tecco
*Assistant Examiner* — Praachi M Pathak
(74) *Attorney, Agent, or Firm* — Malcolm J. Chisholm, Jr.

(57) ABSTRACT

The system (30) includes a product engager (32), a transporter (34) and a patterned depositor (36) for engaging products (38) and transporting the products (38) from the product engager (32) to the patterned depositor (36), such as between a product bagging machine (56) that forms and fills a bag (24), a conveyor that transports the bags as the products (38) and delivers them to a case packing machine as the patterned depositor (36). The product engager (32) and the patterned depositor (36) include first and second drivers (46, 48) and the transporter (34) includes an adjustable-length buffer (50) to compensate for any temporary difference between a first product delivery rate of the product engager (32) and a rate of movement of the products (38) passing from the product engager (32) along the transporter (34) to the patterned depositor (36).

7 Claims, 16 Drawing Sheets

(51) Int. Cl.
*B65B 35/30* (2006.01)
*B65B 3/00* (2006.01)
*B65B 5/10* (2006.01)
*B65B 61/28* (2006.01)
*B65G 15/44* (2006.01)
*B65G 47/51* (2006.01)
*B65G 47/52* (2006.01)

(56) References Cited

U.S. PATENT DOCUMENTS

| | | | | |
|---|---|---|---|---|
| 3,601,952 A * | 8/1971 | Cato | | B65B 5/068 53/249 |
| 3,805,478 A * | 4/1974 | Stohlquist | | B65B 5/068 53/246 |
| 3,961,697 A * | 6/1976 | Hartman | | B65B 9/087 198/431 |
| 4,356,682 A * | 11/1982 | Mancini | | B65B 57/20 53/244 |
| 5,044,876 A * | 9/1991 | Stohlquist | | B65G 47/082 198/419.3 |
| 5,054,763 A * | 10/1991 | Achelpohl | | B65H 29/66 198/419.3 |
| 5,279,096 A * | 1/1994 | Mims | | B65B 23/16 53/251 |
| 5,495,932 A * | 3/1996 | Dyess | | B65G 47/252 198/416 |
| 5,588,285 A * | 12/1996 | Odenthal | | B65B 5/101 53/171 |
| 5,613,351 A * | 3/1997 | Hamers | | B26F 3/02 53/389.3 |
| 6,199,680 B1 * | 3/2001 | Sakai | | B65B 35/58 198/419.2 |
| 6,546,698 B1 * | 4/2003 | Focke | | B65B 5/101 53/446 |
| 7,264,109 B2 * | 9/2007 | Raque | | B65G 43/10 198/460.1 |
| 2005/0115209 A1 * | 6/2005 | Michelotti | | B65B 57/14 53/496 |
| 2013/0327615 A1 * | 12/2013 | Cassoni | | B65G 13/12 198/617 |

* cited by examiner

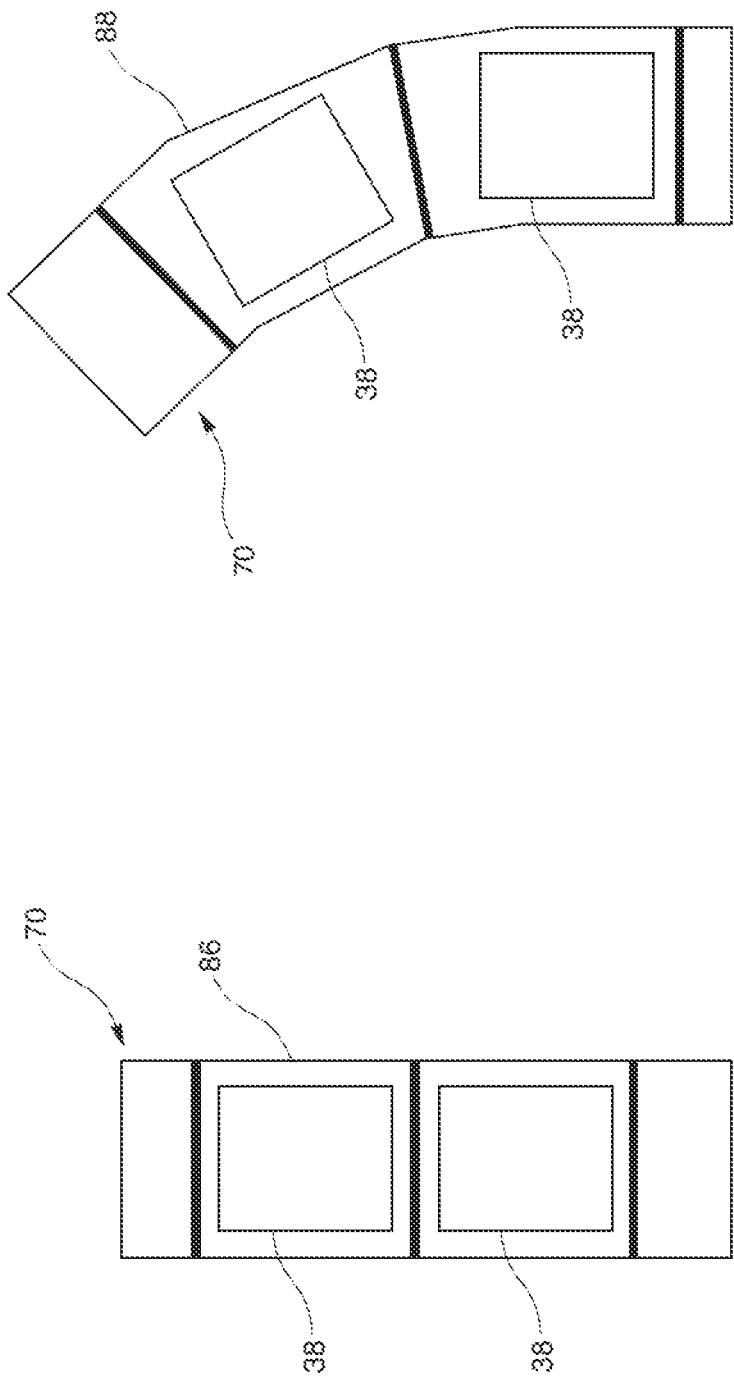

AUTOMATED PRODUCT ENGAGER, TRANSPORTER AND PATTERENED DEPOSITOR SYSTEM

CROSS-REFERENCE TO RELATED APPLICATION TECHNICAL FIELD

This Application claims the benefit of U.S. Provisional Patent Application Ser. No. 61/401,203 that was filed on Aug. 9, 2010 entitled "Bag Packaging Machine".

TECHNICAL FIELD

This disclosure relates to automated systems for engaging products to process the products and then position them on a transporter to transport the products to a patterned depositor for depositing the products in a pattern. An example includes filling bags with food, placing the bags on a conveyor and depositing the bags in a packing pattern within a packing case.

BACKGROUND ART

It is well known that filling product containers, such as potato chips bags and similar "snack food" containers, typically involves utilization of very large complex machines and systems. For example, a first machine of such a system receives a continuous stream of bagging material from a large roll of the material and processes the material around a sleeve to form a bag container. The first machine also usually includes a bag loading component to load a product into the bag and the machine then seals the product within the bag producing a plurality of "pillow" shaped containers moving through the first machine. As the containers leave the machine they are cut to form individual product containers.

For example, FIG. 1 shows a schematic, simplified drawing of a prior art container forming, filling and discharge machine at reference numeral 10. The machine 10 includes a product filling tube 12 for receiving flow of product to be secured within a container. A continuous bag stock roll 14 supplies bagging material 16 to the machine 10, and the machine 10 includes rollers 18 that guide the bagging material over a sleeve 20 while the machine 10 feeds a product portion 22 into the sleeve 20. The machine 10 then seals the bagging material 16 into a bag 24 or product container around the product portion 22, and then cuts the formed bag 24 from the bag stock 16 usually with heated jaws 25. The separated bags 24 are then fed into a receiver 26 of an inclined conveyor 28 having optionally side rails 29 and a conveyor drive 30 such as a motor, to deliver the separated bags 24 to a second machine (not shown) for packing the bags 24 into a case (not shown).

As the filled bags 24 are positioned upon the conveyor 28 they frequently have a random orientation and spacing between each bag. This presents several problems. First, known bag filling machines process the bag stock 16 into filled containers 24 at a fixed product delivery rate. However, as the containers 24 arrive at a second machine (not shown) to be deposited into packing cases, the second machine must deposit the bags 24 at varying delivery rates. This is because the bags 24 are placed within each case in a packing pattern to enhance efficiency of packing costs. Second, the depositing machine must deposit the bags 24 in a sequence of cases that typically flow along a conveyor within or adjacent the second machine. Consequently, the second machine or patterned depositor roust interrupt depositing of the bags 24 as the depositor moves to load a first case and then a next case. This interruption also results in a practical limit on a total rate of product transfer to the depositor. Efforts to increase the rate of transfer and packaging are constrained by limits of the patterned depositor's receipt of the bags 24. As a rate of transfer increases, necessary interruptions in transferring bags through the depositor causes ever increasing disruptions of the bags on the conveyor. Consequently, these disruptions result in an effective limit on the total rate of transfer.

A third problem associated with known package processing and packing systems is that the filled bags 24 are most often tested for proper sealing. This is usually done by sensing machines (such as pressure sensing plungers (not shown)) positioned along the inclined conveyor 28. Because the bags 24 have a random position on a conveyor 28, such sensing machines require substantial space on or adjacent the conveyors 28 and also require positioning guides or similar apparatus to properly align the bags 24 for sensing. This results in more potential disruption of the flow of the bags 24, an additional cost resulting from random positioning of the bags 24 on the conveyor 28.

It is known that such disruptions in flow of the containers 24 may cause a "mountaining up" of bags 24 adjacent the second machine leading to disruption of the automated system and requiring expensive human intervention. It is also known that such elaborate processing and packing systems have integrated complex and costly container alignment and positioning equipment adjacent the patterned depositor or second machine to automate resolution of the aforesaid problems.

Accordingly, there is a need for an efficient, inexpensive solution to these difficulties.

SUMMARY OF THE DISCLOSURE

The disclosure is an automated system that includes a product engager, a transporter and a patterned depositor for engaging products and transporting the products from the product engager to the patterned depositor. The patterned depositor then deposits the products in a pattern, such as within a packing case or upon a distribution conveyor. The product engager includes a first driver for moving products through the product engager to the transporter at a first product delivery rate. The patterned depositor includes a second driver for moving the products through the patterned depositor at a second product delivery rate. The transporter includes an adjustable-length buffer that extends between the product engager and the patterned depositor. The adjustable-length buffer includes either a flexibly linked product stream and/or an adjustable position conveyor. By selectively varying a length of the transporter, such as a conveyor, the transporter provides a variable rate of movement of the products passing from the product engager to the patterned depositor.

The patterned depositor is configured to selectively change the second product delivery rate of the products moving through the patterned depositor to be either greater than, less than or the same as the first product delivery rate. This enables the present system to thereby compensate for any temporary difference between the first product delivery rate and the rate of movement of the products passing from the product engager to the patterned depositor.

In one embodiment of the system, the product engager is a product bagging machine that forms a bag from flexible or semi-ridged bagging material, fills the bag with a product, and seals the bag. However, the bags are not cut by the bagging machine. Instead, the bags are delivered to the transporter as a flexibly linked product stream. In this embodiment, as the stream reaches the patterned depositor, the adjustable-length buffer may simply be the linked product stream. As the patterned depositor receives the product stream, it cuts the bags from the stream and deposits them into packing cases. The depositor necessarily changes its rate of product transfer from the depositor into the packing cases to accommodate depositing in specific packaging patterns and to move from depositing bags in a first case to deposit the bags in a second packing case.

When the depositor interrupts its product transfer to move to a next row in a packing pattern or to move from one case to another, a rate of product delivery necessarily slows down. This causes the stream of linked containers to form one or more upside down "V"-shaped profiles upon the conveyor as a rate of movement, of the linked product stream slows down. If the bags had been cut into separate containers, such a disruption in movement of the bags would cause a piling up of the bags on the conveyor and a random orientation of the bags. If the linked containers may also just droop down by gravity if they are not being supported. This embodiment may also include rails extending above opposed sides of the conveyor to restrict any lateral movement of the upside down shaped linked product stream off of the conveyor.

The patterned depositor, or in this embodiment a case packing machine, includes a second driver, such as an electric motor, chain, gears, etc., that is configured to move the bags through the patterned depositor and into a packing case at a delivery rate to the packing case that is the same as, faster than, or slower than a delivery rate of the bags passing out of the bagging machine. For example, while the depositor is depositing bags into the packing case along a pattern line including many bags, the second driver moves the bags through the depositor at the same delivery rate as the rate of delivery of the bags passing out of the bagging machine. As the depositor stops depositing bags to move to a new pattern line, the second driver moves the bag through the depositor at a rate slower than the delivery rate of the bagging machine.

Once the depositor has reached the position of the new pattern line, or adjacent a second packing case, the second driver moves the bags through the depositor at a delivery rate greater than the delivery rate of the bagging machine for a predetermined short duration. This removes from the linked product stream on the conveyor any disruption in the profile of the stream, such as two bags forming an upside down "V"-shaped profile.

Alternatively, the adjustable-length buffer in this embodiment may be in the form of an adjustable position conveyor. For example, a feed length of the conveyor extending between the bagging machine and the patterned depositor may be selectively adjusted to increase and decrease the feed length of the conveyor for predetermined intervals to compensate for necessary changes in the product transfer rate of the depositor that are described above.

In another embodiment, the product engager is also a product bagging machine that forms bags or pouches from a flexible or semi-ridged bagging material, fills the bags with a product, seals the bag and cuts each bag from the strip of bagging material. In this embodiment however, the transporter is a conveyor that includes vertical walls or "flights" that extend above the conveyor and cross the conveyor in a direction perpendicular to a direction of travel of the conveyor. The vertical walls are configured so that each bag or pouch is positioned between two vertical walls to restrict any motion of the bag upon the conveyor. Because the bags are cut at the bag machine, the adjustable-length buffer of the transporter must be an adjustable position conveyor. An example of such an adjustable position conveyor is described above.

In yet another embodiment, the product engager may be case loader that transfers packed cases from a conveyor to a transporter that is a pallet feeder. The patterned depositor may be an automated palletizing machine, such as shown in U.S. Pat. No. 7,607,883 that issued on Oct. 27, 2009 to Yagi. Because such packed cases cannot be a linked product stream, the adjustable-length buffer of the transporter must be an adjustable position conveyor as described above.

In a further embodiment the product engager may be a position guide for positioning picker heads of a robotic "pick-and-place" system for moving randomly positioned products from a first location to a second location. The transporter may be an endless loop that moves a plurality of the picker heads from the position guide to a location guide that is a form of the patterned depositor. The location guide locates the picker heads of the transporter into a desired pattern at the second location and then guides the empty picker heads through rollers back to the position guide to pick up additional products. Such machines are common in movement, of light delicate products, such as cookies and integrated circuits, etc. The same problems described above with respect to bagging machines and packing machines apply to "pick-and-place" robots. Typically the pickup heads are fed to pick up the random products at a constant speed and the location guide must locate them within a pattern at varying speeds. This embodiment therefore also utilizes an adjustable position conveyor similar to those describe above.

The adjustable position conveyors that transport non-linked, or separated products adjust a distance of a feed length of the conveyor by utilizing a flat "S"-shaped or upside down "V"-shaped feed length of the conveyor. To increase the distance of the feed length, curves or bends of the feed length are made more acute so that the feed length is adjusted in a generally vertical direction. Alternatively, the feed length may be a flat curve utilizing conveyor lengths that hinge laterally so that the feed length adjusts it distance along a plane that is horizontal. For such a feed length to extend the distance traveled by the products between the product engager and the patterned depositor, as the feed length is increased, a return length of the transporter is necessarily decreased a corresponding distance. Additionally, the adjustable position conveyors described herein may also include movement of one or both of the product engager and the patterned depositor toward and away from each other as the conveyor adjusts its feed and return lengths.

Accordingly, it is a general purpose of the present disclosure to provide an automated product engager, transporter and patterned depositor system that overcomes deficiencies of the prior art.

It is a more specific purpose to provide an automated product engager, transporter and patterned depositor system that increases efficiencies and minimizes operating costs of engaging, transporting and depositing products in a pattern.

These and other purposes and advantages of the present automated product engager, transporter and patterned depositor system will become more readily apparent when the following description is read in conjunction with the accompanying drawings.

BRIEF DESCRIPTION OF THE DRAWINGS

FIG. 11 is a simplified schematic top-plan view showing products upon a straight section of a conveyor.

FIG. 12 is a simplified schematic top-plan view of products upon a conveyor having an adjustable position, horizontal curve.

PREFERRED EMBODIMENTS OF THE DISCLOSURE

Figure 2:
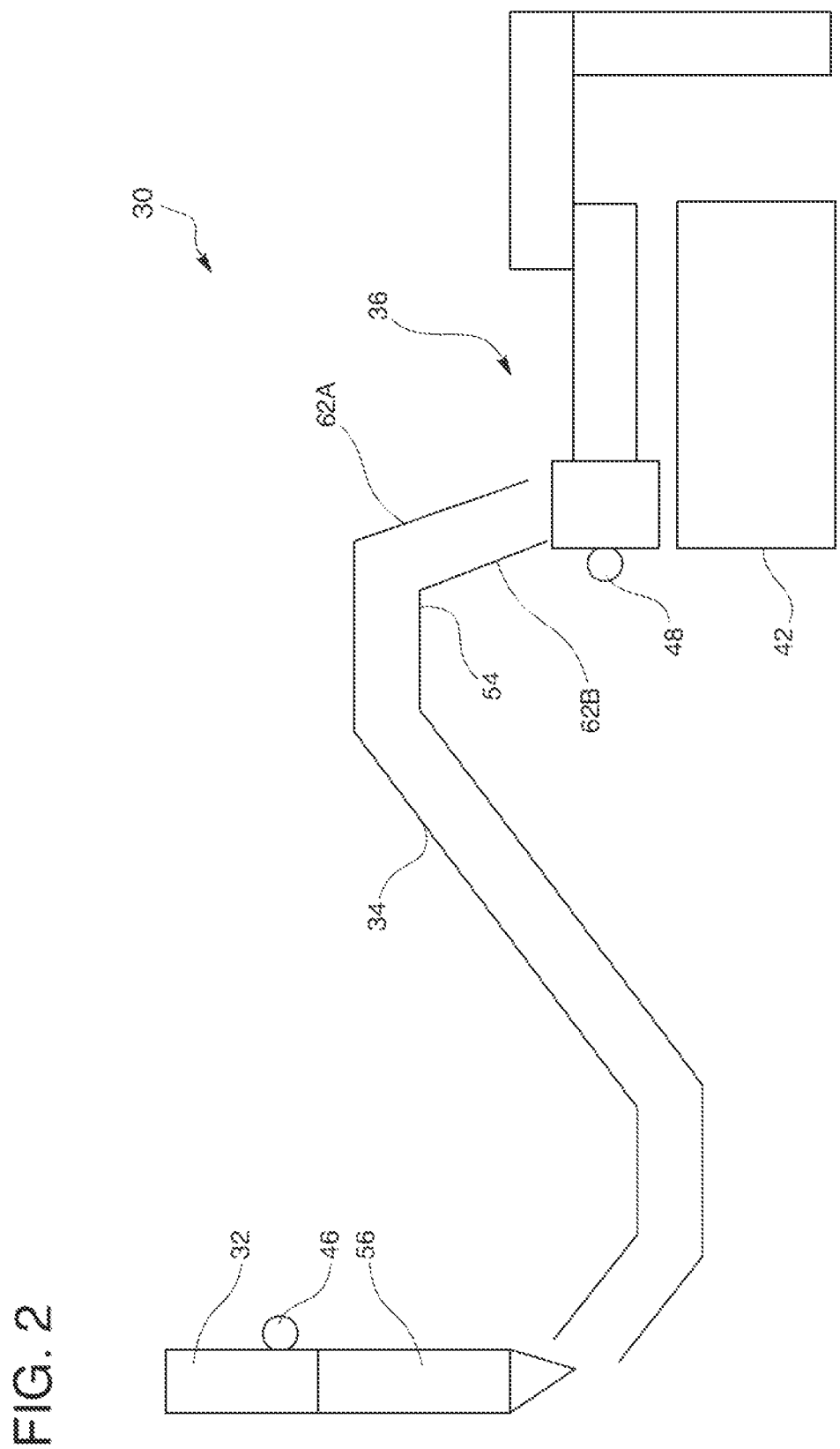
FIG. 2 is a simplified schematic drawing showing a product engager, transporter, and a patterned depositor constructed in accordance with the present disclosure.
Figure 3:
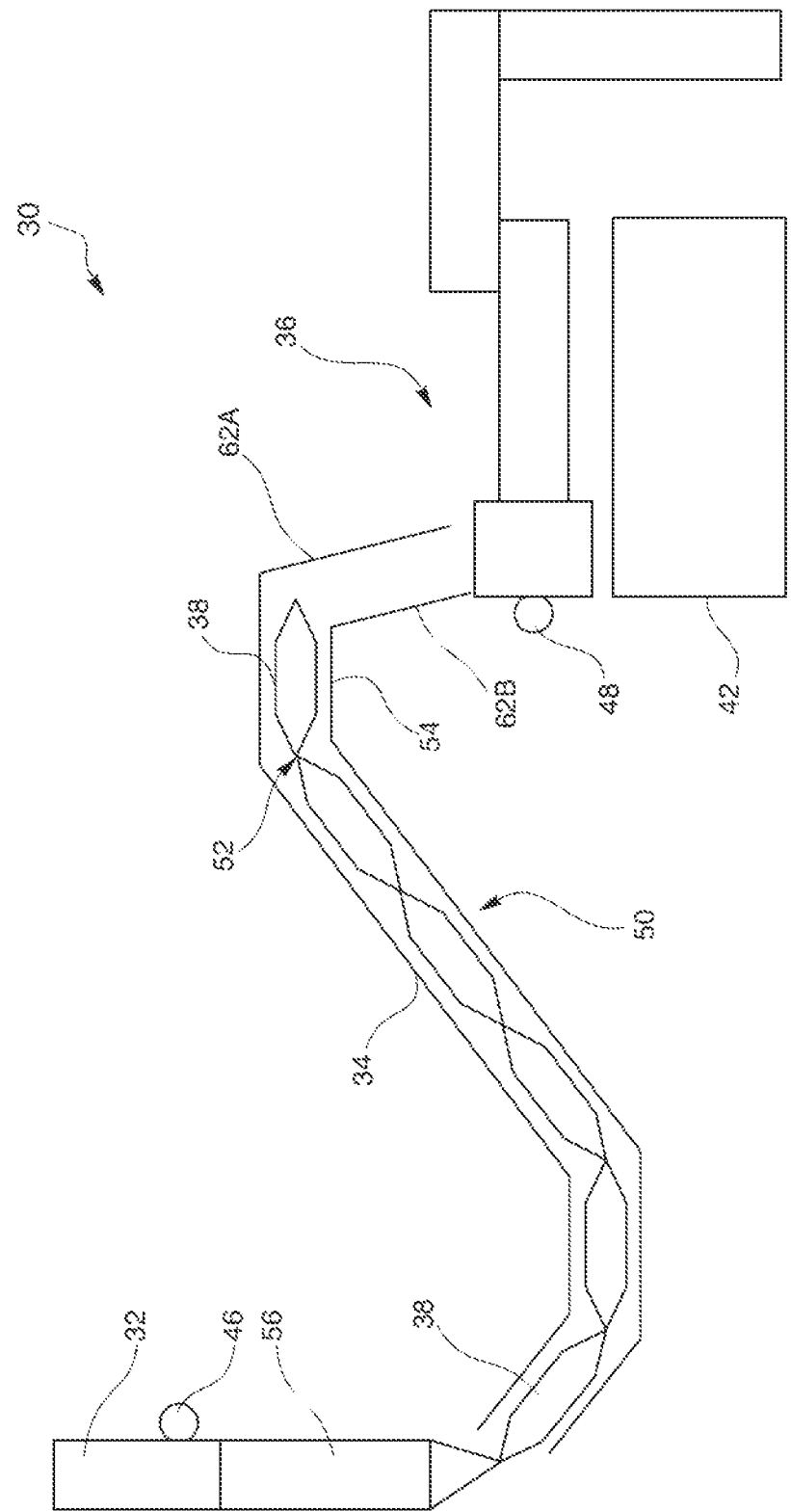
FIG. 3 is a simplified schematic drawing showing a flexibly linked product stream as an adjustable-length buffer within the FIG. 2 product engager, transporter, and a patterned depositor.
Figure 4:
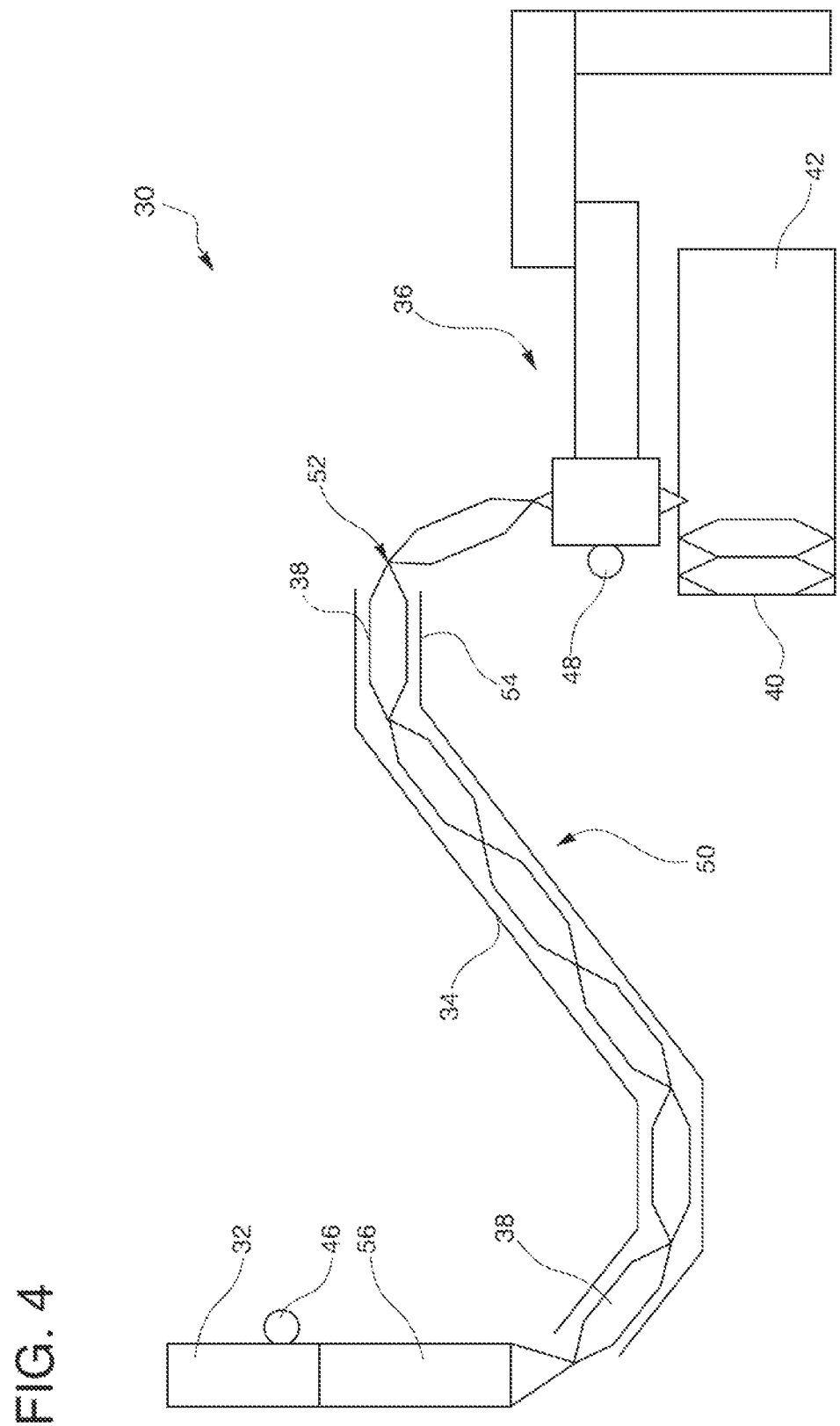
FIG. 4 is a simplified schematic drawing of the product engager, transporter, and a patterned depositor of FIG. 3 showing the patterned depositor depositing products in a pattern within a packing case.

Referring to the drawings in detail, a simplified schematic drawing of an automated product engager, transporter and patterned depositor system of the present disclosure is shown in FIGS. 2-4 and is generally designated by the reference numeral 30. The system 30 includes a product engager 32, a transporter 34 and a patterned depositor 36 for engaging products 38 and transporting the products 38 from the product engager 32 to the patterned depositor 36. The patterned depositor 36 then deposits the products 38 in a pattern 40 (shown in FIGS. 4 and 5), such as within a packing case 42 or upon a distribution conveyor 44 (shown in FIG. 14).

The product engager includes a first driver 46 for moving products 38 through the product engager 32 to the transporter 34 at a first product delivery rate. The patterned depositor 36 includes a second driver 48 for moving the products 38 through the patterned depositor 36 at a second product delivery rate. The transporter 34 includes an adjustable-length buffer 50 that extends between the product engager 32 and the patterned depositor 36. The adjustable-length buffer 50 may include a flexibly linked product stream 52 (shown best in FIGS. 4 and 6) and/or an adjustable position conveyor 54. By selectively varying a length of the transporter 34, such as a conveyor 54, the transporter 34 provides a variable rate of movement of the products 38 passing from the product engager 32 to the patterned depositor 36.

The patterned depositor 36 is configured to selectively change the second product delivery rate of the products 38 moving through the patterned depositor 36 to be either greater than, less than or the same as the first product delivery rate of the product engager 32. This enables the present system 30 to thereby compensate for any temporary difference between the first product delivery rate of the product engager 32 and the rate of movement of the products 38 passing from the product engager 32 along the transporter 34 to the patterned depositor 36.

Figure 1:
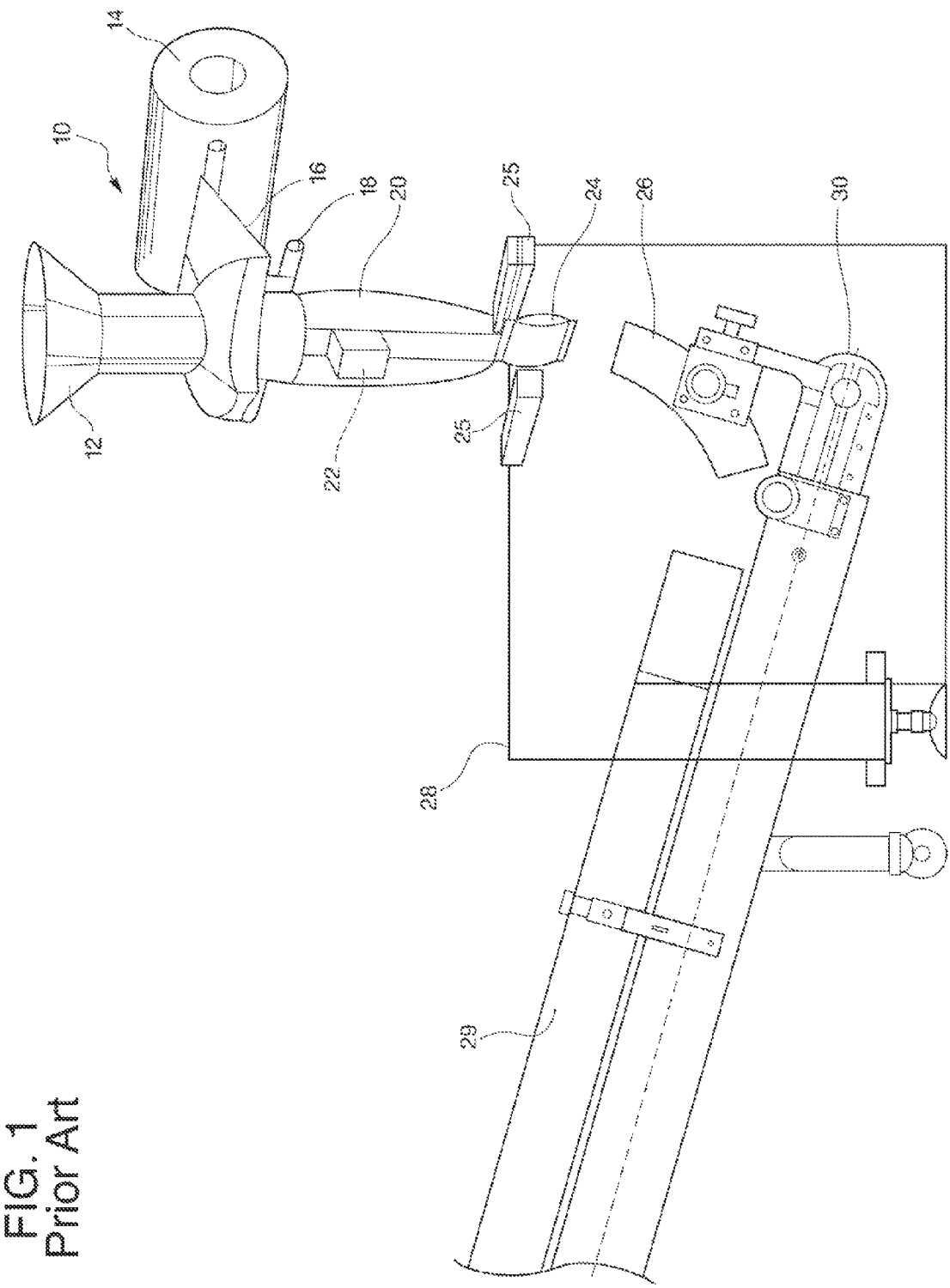
FIG. 1 is a schematic simplified drawing of a prior art container forming, filling and discharge machine.
Figure 5:
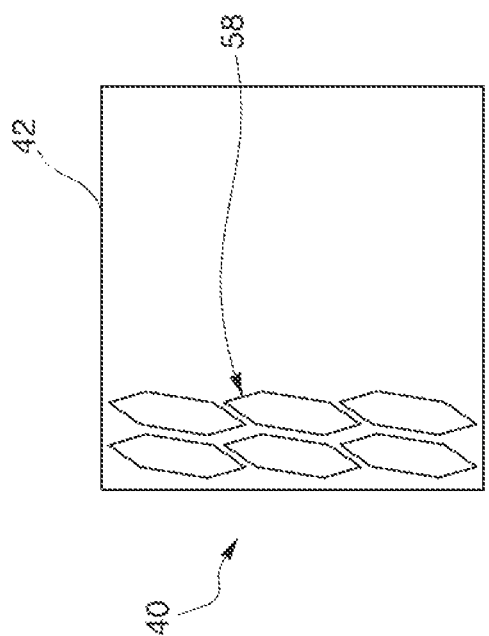
FIG. 5 is a simplified schematic top plan drawing of a packing case showing products deposited in a "shingle" pattern within a packing case.
Figure 10:
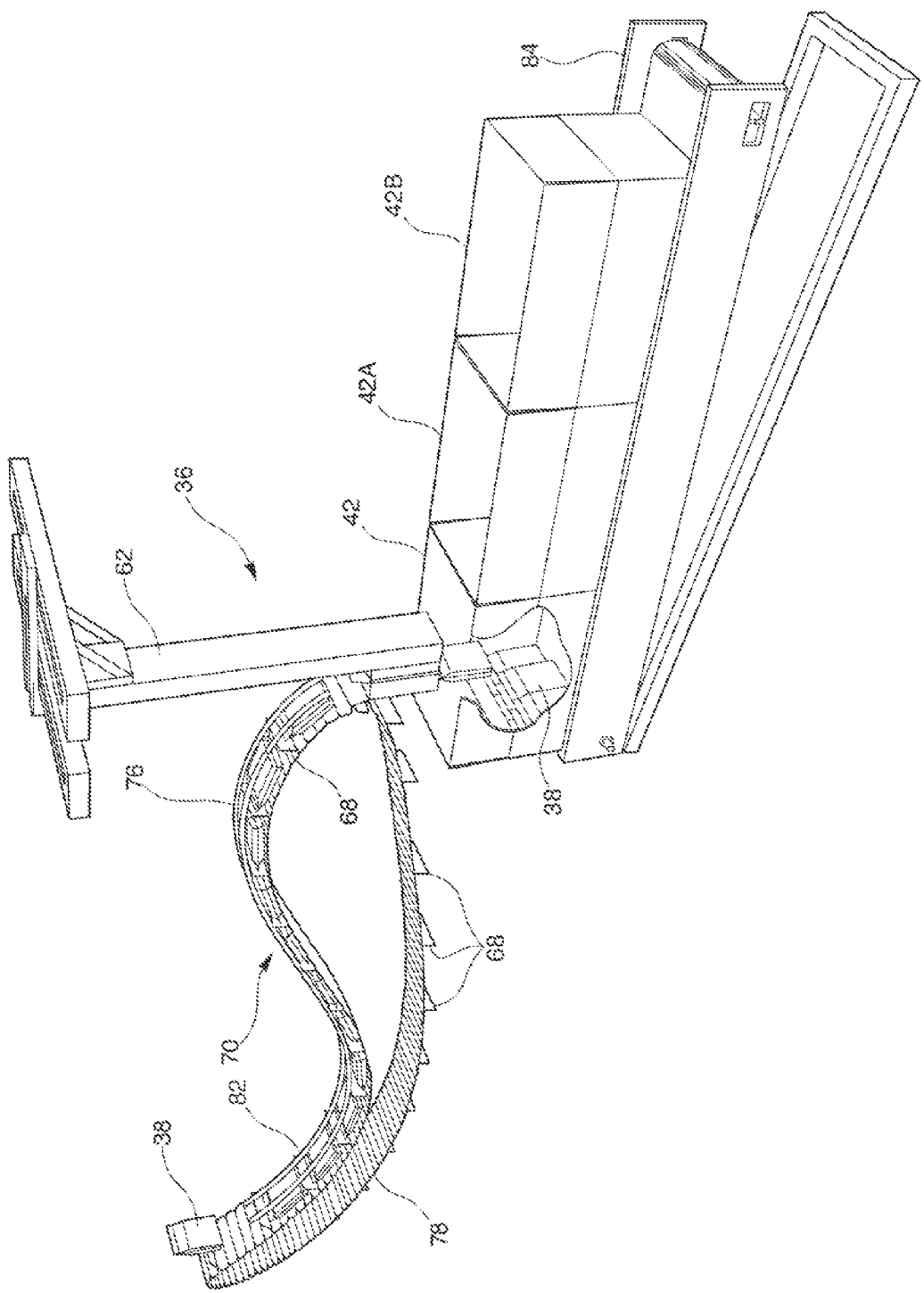
FIG. 10 is a simplified perspective drawing showing an adjustable-length buffer of a transporter of the present disclosure as an adjustable position conveyor configured to include a sideways "S"-shaped feed length of the conveyor and showing packing cases being delivered on a second conveyor to the patterned depositor of the present disclosure.

In one embodiment of the system 30, the product engager 32 is a product bagging machine 56 that forms a bag 24, 38 from flexible or semi-ridged bagging material 16 (shown in FIG. 1). The bagging machine 56 fills the bags 24, 38 with products 20, and seals the bags 24, 38. However, in the present embodiment the bags 24, 38 are not cut by the bagging machine 56. Instead, the bags 24, 38 are delivered to the transporter 34 as the flexibly linked product stream 52. In this embodiment, as the stream 52 reaches the patterned depositor 36, the adjustable-length buffer 50 may simply be the linked product stream 52. As the patterned depositor 36 receives the product stream 52, it cuts the bags 38 from the stream 52 and deposits them into the packing case 42. The depositor 36 must necessarily change its rate of product transfer from the depositor 36 into packing cases 42 to accommodate depositing in specific packaging patterns 40 and to move from depositing bags 38 in a first case 42 to deposit the bags 38 in subsequent packing cases 42A, 42B (as shown in FIG. 10). FIG. 5 shows a common packing pattern 40, referred to as a "shingle pattern", which is frequently utilized for automated packing for "snack food" products such as potato chips, pretzels, etc.

When the patterned depositor 36 or case packing machine 36 interrupts its product 38 delivery to move to a next row 58 (shown in FIG. 5) in a packing pattern 40 or to move from one case 42 to another 42A, 42B, a rate of product 38 delivery necessarily slows down. This causes the stream 52 of linked products 38 to form one or more upside down "V"-shaped profiles 60 (shown in FIG. 7) upon the conveyor 54 as a rate of movement of the linked product stream 52 slows down. If the bags or products 38 had been cut into separate containers, such a disruption in movement of the bags 38 would cause a piling up of the bags 38 on the conveyor 54 and a random orientation of the bags 38. This embodiment of the system 30 may also include rails 29 (shown in FIG. 1) extending above the conveyor to restrict any lateral movement of the upside down "V"-shaped profile 60 or linked products 38 of the conveyor 54.

Figure 6:
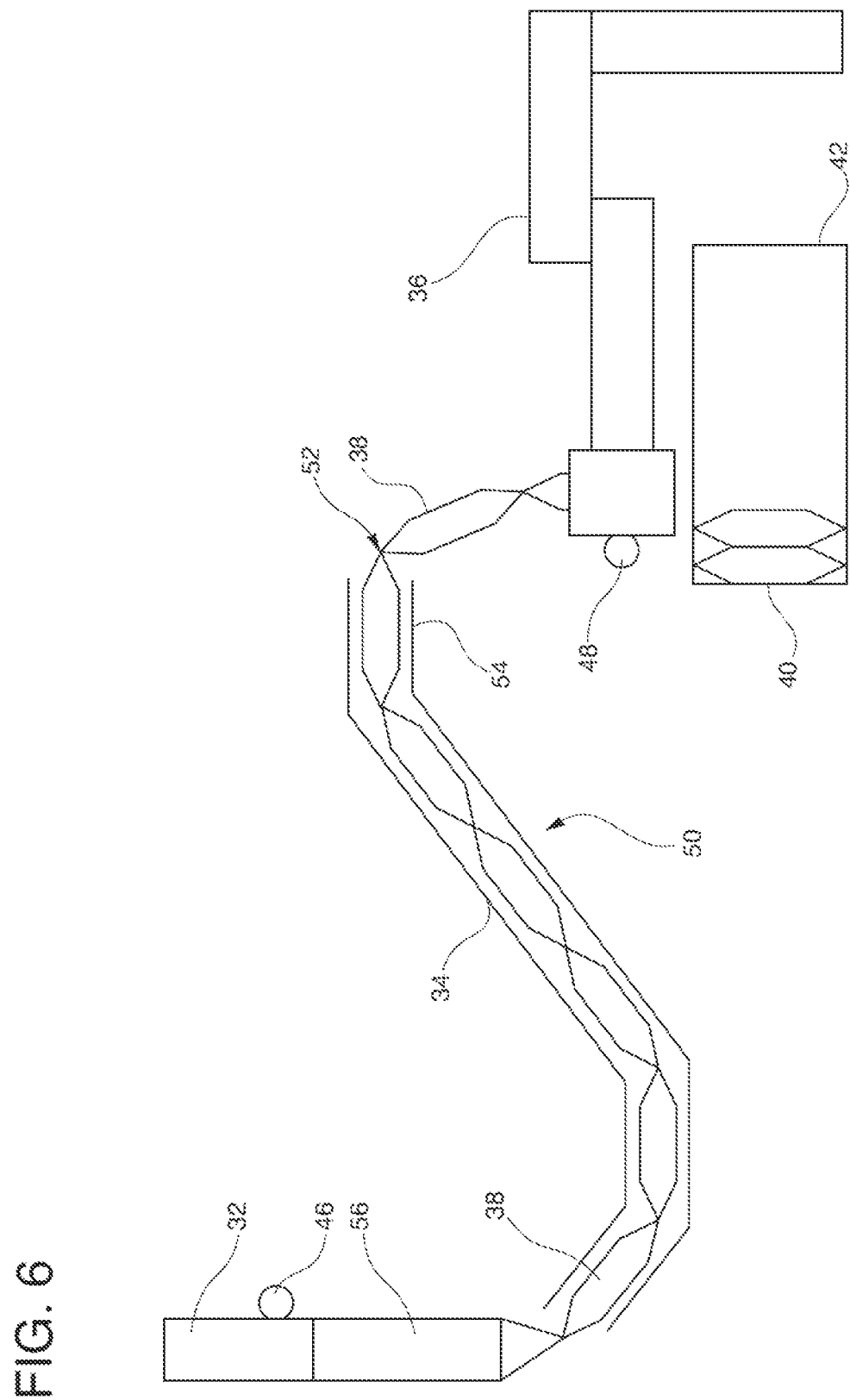
FIG. 6 is a simplified schematic drawing of the product engager, transporter, and a patterned depositor of FIG. 4 showing an adjustable position conveyor as an adjustable-length buffer in a position different than shown in FIG. 4.

Alternatively, this embodiment of the system 30 may utilize the adjustable position conveyor 54 as the adjustable-length buffer 50 to selectively change a distance the products 38 must travel between the bagging machine 56 and the patterned depositor 36. A difference in the distance between the bagging machine 56 and the patterned depositor 36 or case packing machine 36 is shown in contrast of FIG. 4 and FIG. 6. FIG. 4 shows withdrawal of guides 62A, 62B to facilitate change in the position of the conveyor 54. FIG. 6 shows that the conveyor 54 has adjusted its position to increase the distance between the bagging machine 56 and the case packing machine 36.

It is noted that adjustable position conveyors 54 of the present disclosure may increase or decrease a distance between the product engager 32 and patterned depositor 36 by changing curves or bends within the conveyors 54, or by movement of one or both of the product engager 32 and the patterned depositor 36 toward or away from each other.

As recited above, the second driver 48 of the patterned depositor 36 may include an electric motor, chain, gears, etc., that is configured to move the products 38 through the patterned depositor 36 and into the packing case 42 at a delivery rate to the packing case 42 that is the same as, faster than, or slower than a delivery rate of the products 38 passing out of the bagging machine or product engager 32. For example, while the depositor 36 is depositing bags or products 38 into the packing case 42 along a pattern line 40 including many bags 38, the second driver 48 moves the bags 38 through the depositor 36 at the same delivery rate as the rate of delivery of the bags 38 passing out of the bagging machine 32. As the depositor 36 stops depositing bags 33 to move to a new pattern line 58 (shown in FIG. 5), the second driver 48 moves the bag 38 through the depositor 36 at a rate slower than the delivery rate of the bagging machine 32.

Once the depositor 36 has reached the position of the new pattern line 58, or adjacent a second packing case 42A, the second driver 48 moves the bags 38 through the depositor 36 at a delivery rate greater than the delivery rate of the bagging machine 32 for a predetermined short duration. This removes from the linked product stream 52 on the conveyor 54 any disruption in the profile of the stream 52, such as two bags 38 forming an upside down "V"-shaped profile 60. Change in the delivery rate of the second driver may be controlled by a controller (not shown) known in the art for controlling motor speeds in response to sensed signals. For example, a sensor (not shown) may sense formation of an upside down "V"-shaped profile 60 on the conveyor 54 and signal the second driver 48 to slow down, etc.

Alternatively, the second driver 48 may simply be synchronized through known gear mechanisms (not shown) to operate at a same delivery rate as the first driver 46 of the product engager 32 for a predetermined duration, then slow down for a predetermined duration, then speed up for a predetermined duration, and then return to the same speed as the first driver 46. The second driver 48 may then repeat this cycle based upon a pattern 40 deposit protocol.

Figure 7:
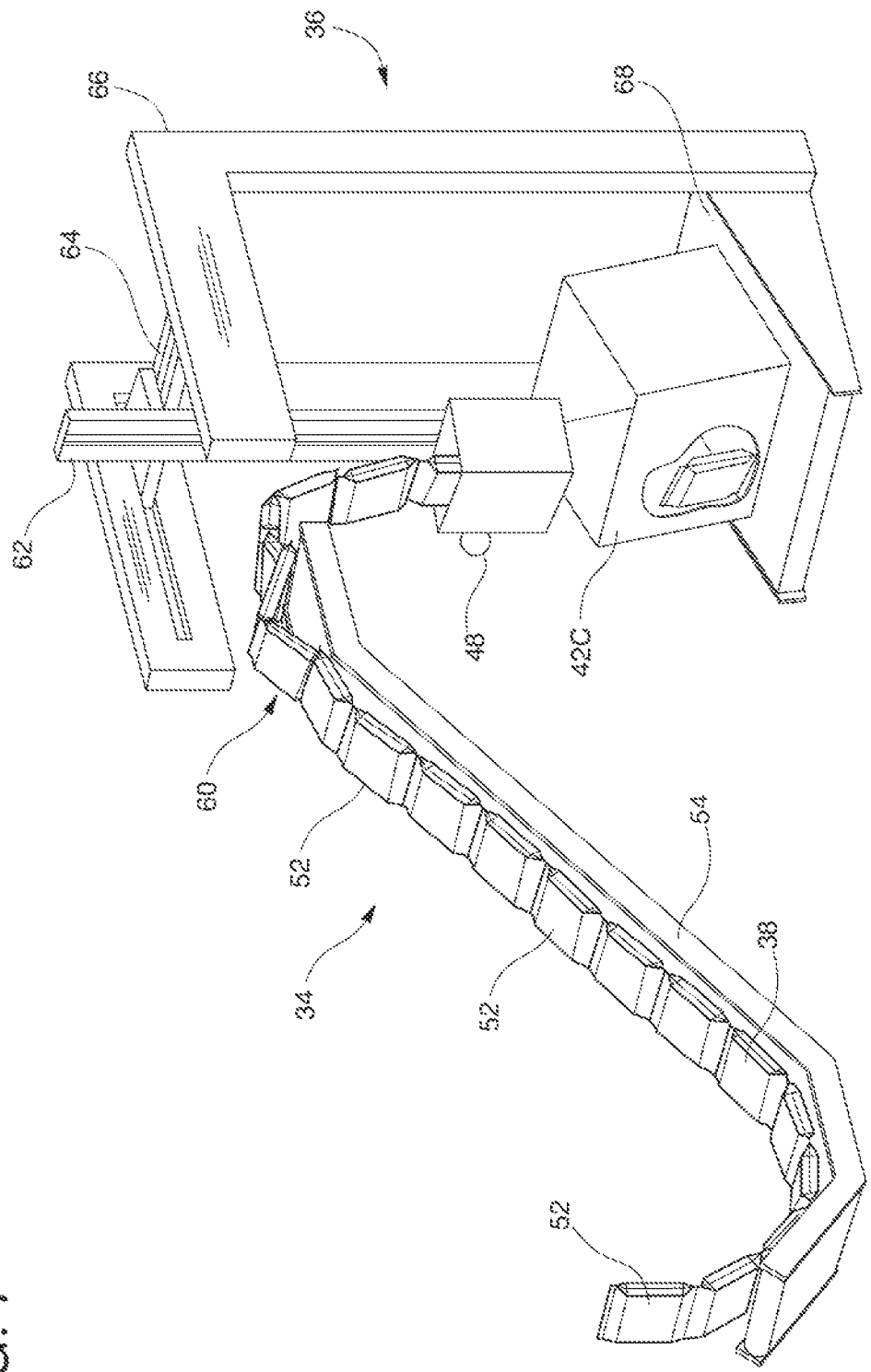
FIG. 7 is a simplified perspective view showing a flexibly linked product stream as an adjustable-length buffer of a transporter directing the stream into a patterned depositor of the present invention.

FIG. 7 shows a perspective view of the transporter 34 and the patterned depositor 36 as a case packing machine 36. An upside down "V"-shaped profile 60 is shown within a flexible length product stream 52 upon the transporter 34. The case packing machine 36 may include a vertical adjustment post 62 and a horizontal adjustment bar 64 mounted within a frame 66 that includes a sloped case support 68 to facilitate patterned depositing 36 within a packing case 42C that moves through the frame 66. Such case packing machines 36 are known in the art. However, the present disclosure includes the patterned depositor 36 having the above described variable rate second driver 48 configured to vary the product delivery rate in response to deposit pattern requirements described above.

Figure 8:
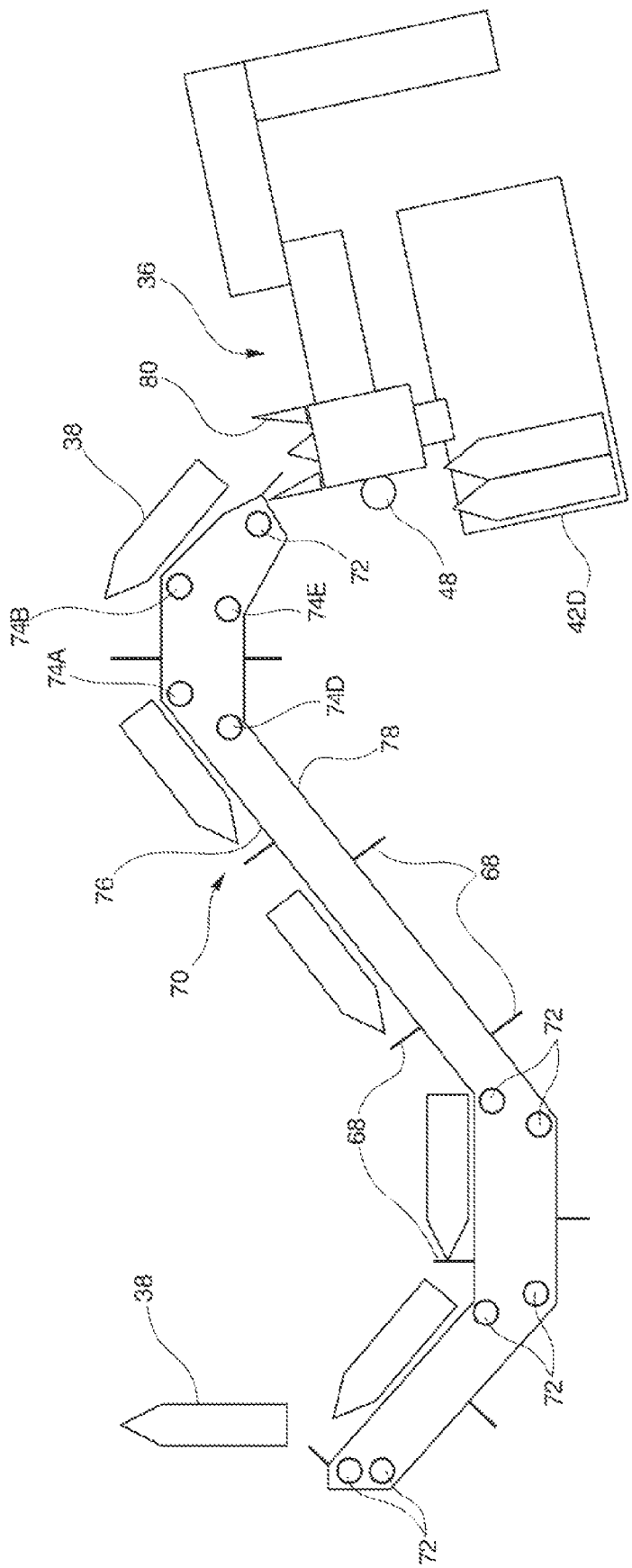
FIG. 8 is a simplified schematic drawing showing products on a transporter separated by vertical walls of the transporter and showing an adjustable-length buffer as an adjustable position conveyor in a first position.
Figure 9:
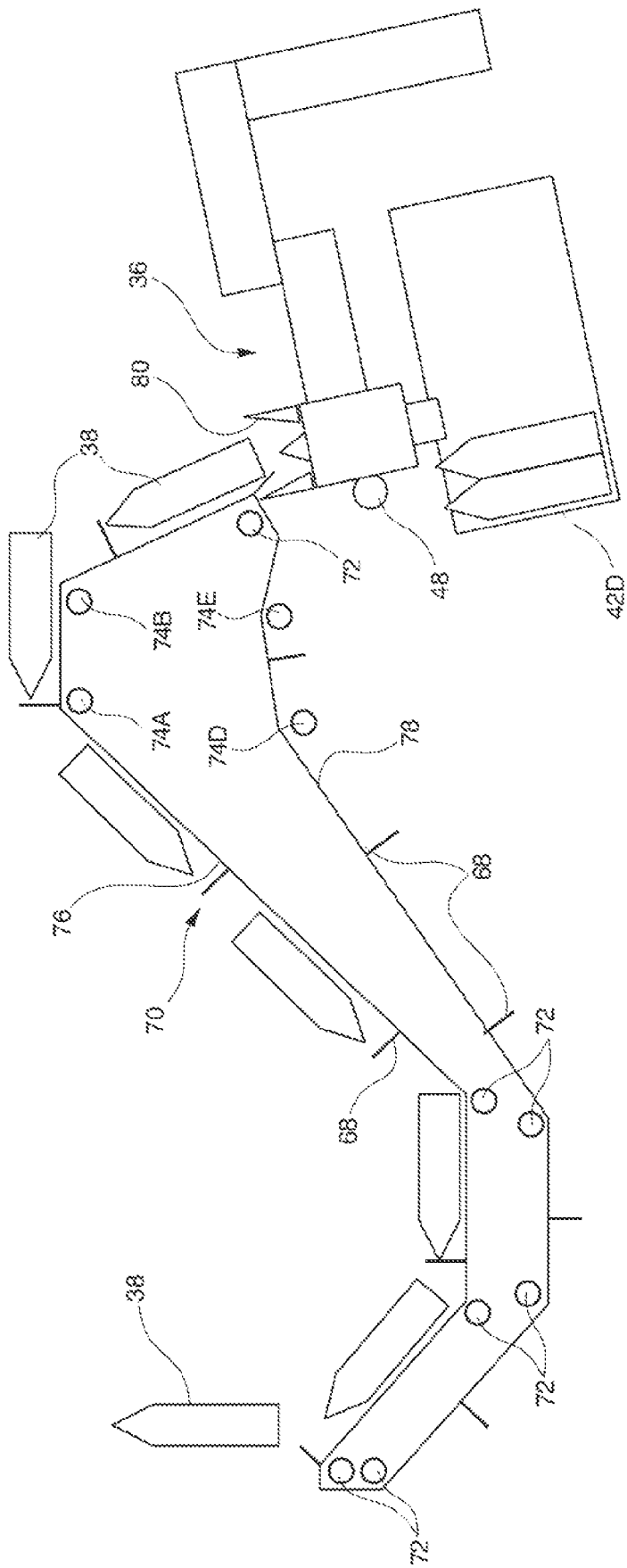
FIG. 9 is a simplified schematic drawing showing the adjustable position conveyor of FIG. 8 in a second position.

In another embodiment shown best in FIGS. 8-10, the product, engager 32 is also a "product bagging" or "vertical bag fill and sealing" machine 56 that forms bags or pouches 38 from flexible or semi-ridged bagging material 16, fills the bag 38 with a product 20, seals the bag 38 and cuts each bag 38 from the strip of bagging material 16. In this embodiment however, the transporter 34 is a conveyor 70 that includes vertical walls or "flights" 68 that extend above the conveyor 70 and cross the conveyor 70 in a direction perpendicular to a direction of travel of the conveyor 70. The vertical walls 68 are configured so that each bag or pouch 38 is positioned between two vertical walls 68 to restrict any motion of the bag 38 upon the conveyor 70. Because the bags 38 are cut at the bagging machine 56, the adjustable-length buffer of the transporter 34 must be an adjustable position conveyor 54, 70.

FIG. 8 shows the adjustable position conveyor 70 mounted upon a plurality of rollers 72 and position adjusters 74A, 74B, 74C, 74D that selectively move a feed length 76 and a return length 78 of the conveyor 70. FIG. 8 shows the feed length 76 in a short deployment, and FIG. 9 shows the feed length 76 in a long deployment. The long deployment of the feed length 76 of FIG. 9 represents a response of the adjustable-length buffer of the transporter 34 to the second driver 48 of the patterned depositor 36 reducing its product delivery rate to below the product delivery rate of the first driver 46 of the product engager 32. FIGS. 8 and 9 also show that, as the feed length 76 is lengthened from the short deployment of FIG. 8 to the long deployment of FIG. 9, the return length 78 of the conveyor 70 simultaneously progresses from a long deployment shown in FIG. 8 to a short deployment of the return length 78 of the conveyor 70 in FIG. 9. FIG. 9 also shows that the patterned depositor 36 may be completely sloped along with a sloped packing case 42D. Additionally, FIGS. 8 and 9 shows that the pattern depositor may include funnel guides 80 to assist movement of the bags 38 into the depositor 36.

FIG. 10 shows a perspective view of the embodiment of the system 30 that includes the conveyor 70 having vertical walls 68 and a bar cover 82 overlying the feed length 76 of the conveyor 70. FIG. 10 also shows that the adjustable position conveyor 70 is configured to include a sideways "S"-shaped feed length 76 above the return length 78 of the conveyor 70. The feed length 76 may be adjusted, as shown in FIGS. 8 and 9, to make the curves in the feed length 76 and the return length 78 more acute or flatter to selectively change the distance the bags or products 38 must travel between the product engager 32 and the patterned depositor 36. FIG. 10 also shows that the packing cases 42, 42A, 42B may be passing adjacent the patterned depositor 36 upon a variable slope conveyor 84.

FIG. 11 is a simplified schematic showing a top plan view of products 38 moving along a straight section 86 of an adjustable position conveyor 70. FIG. 12 shows the same products 38 moving along a horizontally curved section 88 of the adjustable position conveyor 70.

Figure 13:
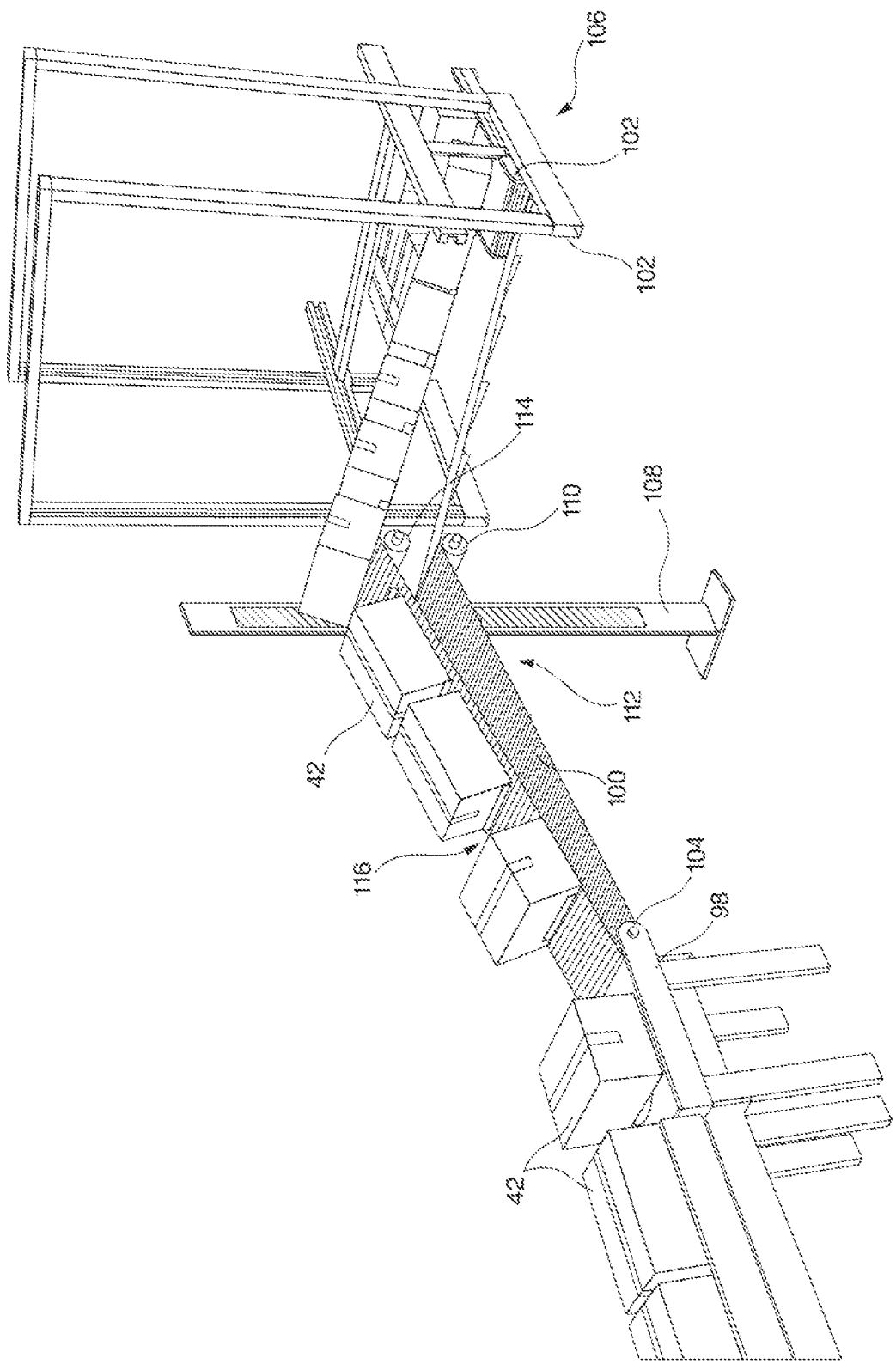
FIG. 13 is a simplified perspective drawing showing a product engager of the present disclosure as a case loader and showing a transporter of the present disclosure as an adjustable position conveyor directing packing cases to a patterned depositor.

FIG. 13 shows a simplified perspective drawing of a further embodiment of the present disclosure, wherein a product engager is a case loader 98, a transporter is an adjustable position conveyor 100 and a patterned depositor 13 is a palletizing machine 102. In this embodiment the case loader 90 includes a first drive 104, and the palletizing machine 102 includes a second drive 106. Also, included is a conveyor position adjuster 108 configured to selectively move a first conveyor positioner 110 secured adjacent a return length 112 of the conveyor 100, and a second conveyor positioner 114 secured adjacent a feed length 116 of the adjustable position conveyor 100. As the palletizing machine 102 moves the adjustable position conveyor 100 to varying positions in feeding packing cases 42 into the palletizing machine 102, the second drive 106 slows down, as described above for the other embodiments. Simultaneously, the conveyor position adjuster 108 moves the feed length 116 of the conveyor 100 to lengthen it, such as by moving it upward in FIG. 13. At the same time the conveyor position adjuster 108 moves the return length 112 of the conveyor 100 to shorten it, such as by moving it downward in FIG. 13.

Figure 14:
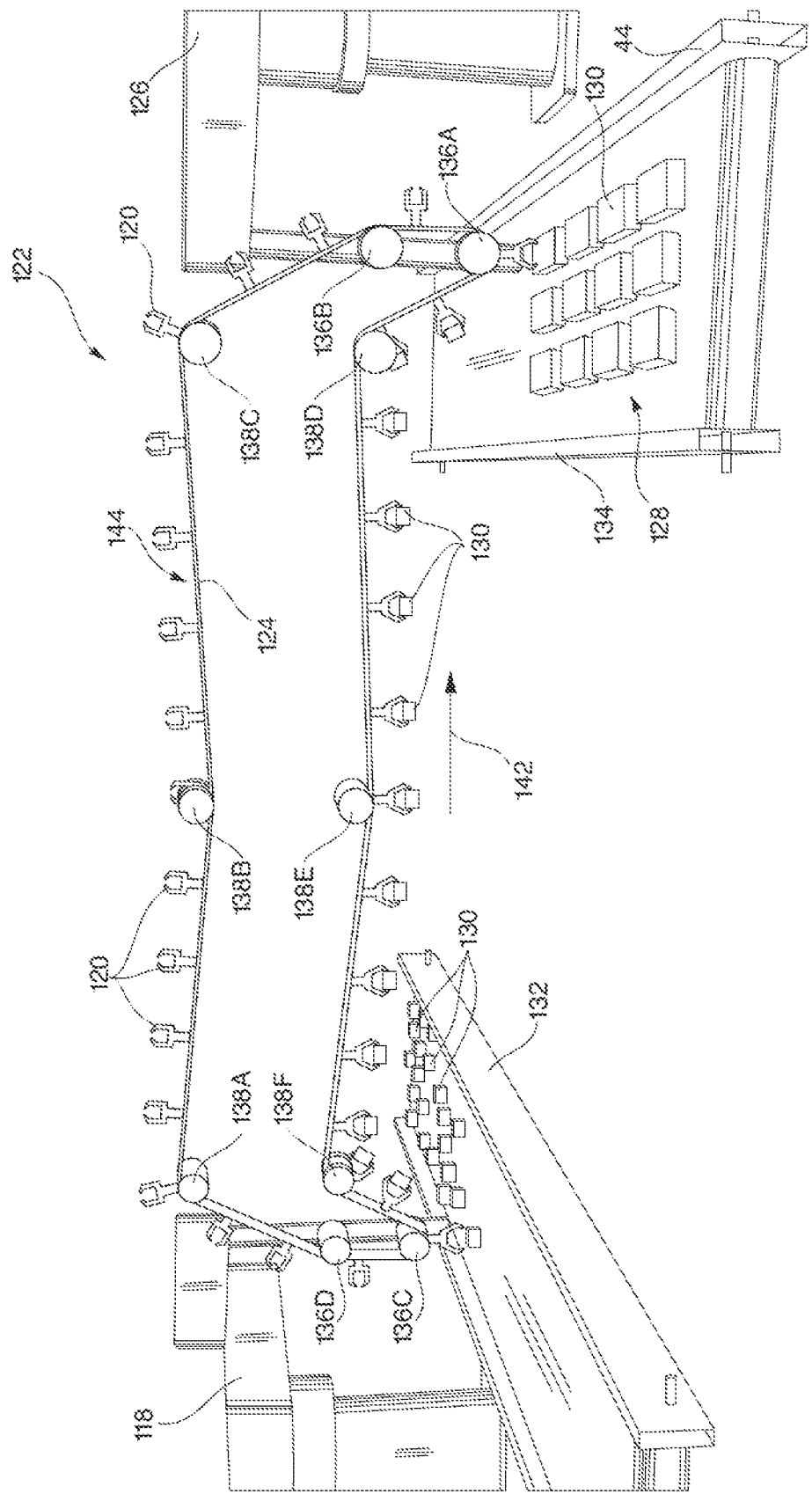
FIG. 14 is a simplified perspective drawing of a product engager of the present disclosure as a position guide for guiding picking heads, showing a transporter of the present disclosure as an endless loop moving the picker heads from the position guide to a patterned depositor of the present invention that is a location guide for locating the picker heads within a pattern.

FIG. 14 shows yet another embodiment of the present disclosure, that includes a product engager as a position guide 118 for guiding picking heads 120 of a robotic pick-and-place machine 122. A transporter of this embodiment is an endless loop 124 moving the picker heads 120 from the position guide 118 to a patterned depositor that is a location guide 126 for locating the picker heads 120 within a pattern 128.

The picker heads 120 are configured to selectively grasp objects 130 that are randomly disposed in a first location such as a first conveyor 132 and move them to placement within the pattern 128 on a second location, such as a second conveyor 134 transporting the objects 130 within the pattern 128. The endless loop 124 then moves the empty picker heads 120 through rollers 136A, 136B, 136C, 136D and position adjusters 138A, 138B, 138C, 138D, 138E, 138F back to the position guide 118 to pick up additional objects 130. Prior art pick-and-place machines (not shown) are common in movement of light delicate products, such as cookies and integrated circuits, etc.

Figure 15:
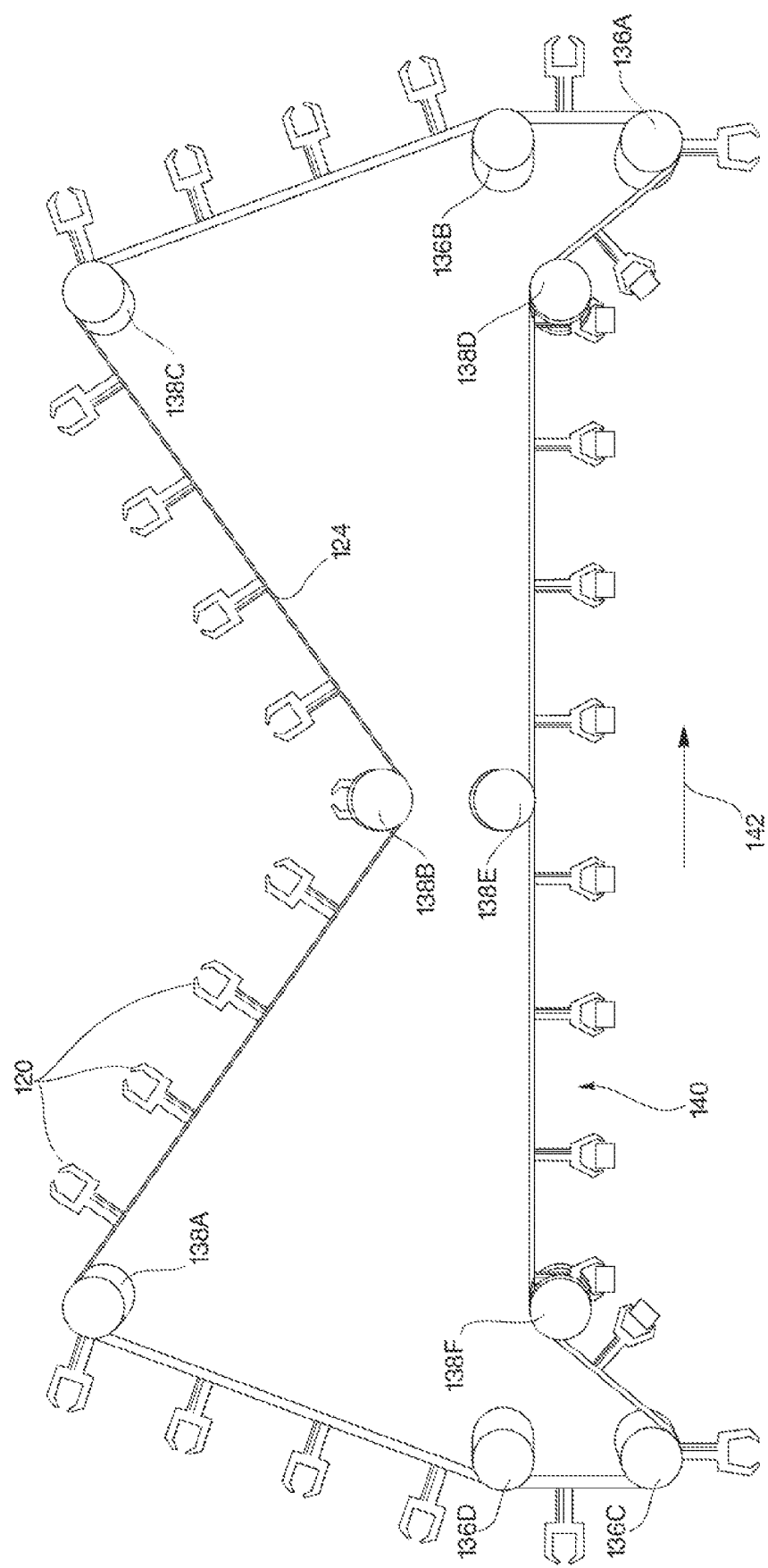
FIG. 15 is a simplified front-plan drawing of the FIG. 14 endless loop showing a feed length and a return length of the endless loop in first positions.
Figure 16:
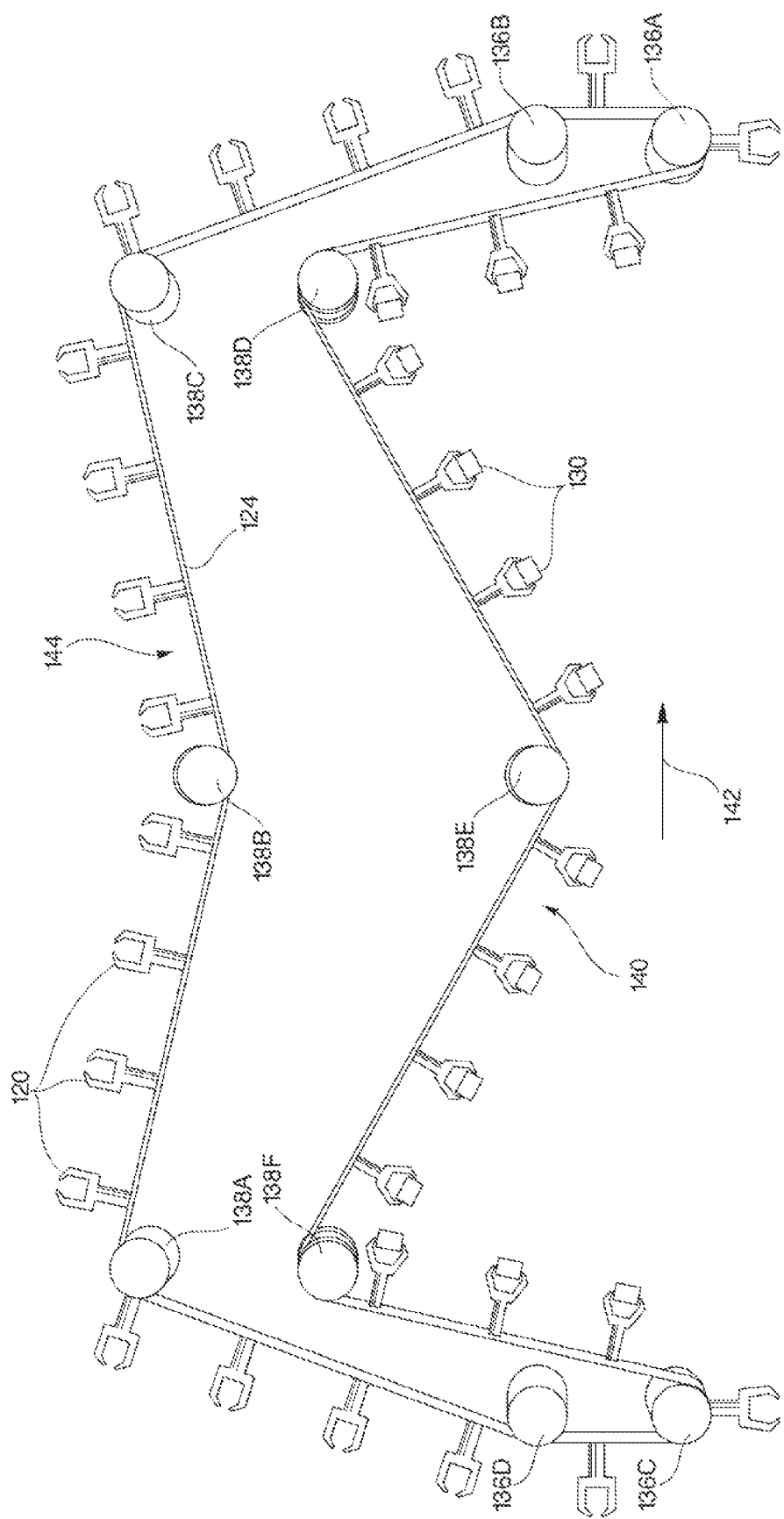
FIG. 16 is a simplified schematic front-plan drawing of the FIG. 14 endless loop showing the feed length and the return length of the endless loop in second positions.

Similar problems described above with respect to bagging machines 56 and case packing machines 36 apply to these pick-and-place robots. Typically the pickup heads 120 are fed to pick up the randomly positioned objects 130 and rapidly move the picked products or objects 130 very rapidly at a pre-determined high rate of speed to achieve a desired throughput rate and to position the objects 130 at the location guide 126. This causes a lot of picked objects 130 to be dropped. The location guide 126 must locate the objects 130 within the pattern 128 at varying speeds. This embodiment therefore utilizes as an adjustable position conveyor the position adjusters 138A-138F. FIG. 15 shows the endless loop 124 in a first position wherein a feed length 140 of the loop 124 is moving in a feed direction 142 represented by a direction arrow 142 and the feed length 140 carries the picker heads 120 a first distance. FIG. 16 shows that the position adjusters 138A-138F have moved the endless loop 124 (such as a flexible belt) so that the feed length 140 is in a second position that requires the picker head 120 to move a distance that is greater than the first distance as shown in FIG. 16. FIG. 16 also shows that the position adjusters 138A-138F move a return length 144 to have a distance that is shorter than the distance of the return length in FIG. 15. As described above, this provides for compensating for high rates of transfer by the endless loop 120. More importantly, this embodiment of the system 30 also provides for short indexing and pulsing motions of the plurality of picker heads 120 because of the flexible, adjustable position endless loop 124 that adjusts a total distance the picker heads must travel in response to needs in transferring the randomly positioned objects 130 to placement in a pattern 128 upon the second location 134. For example, this allows for the picker heads 120 to continue to pick at the first location 132 even if the location guide 126 is unable to place the objects 130 in a pattern 128 at the second location 134, perhaps due to a delay in arrival of a tray (not shown) to support the pattern 128 of the objects 130 on the second location 134.

Figure 17:
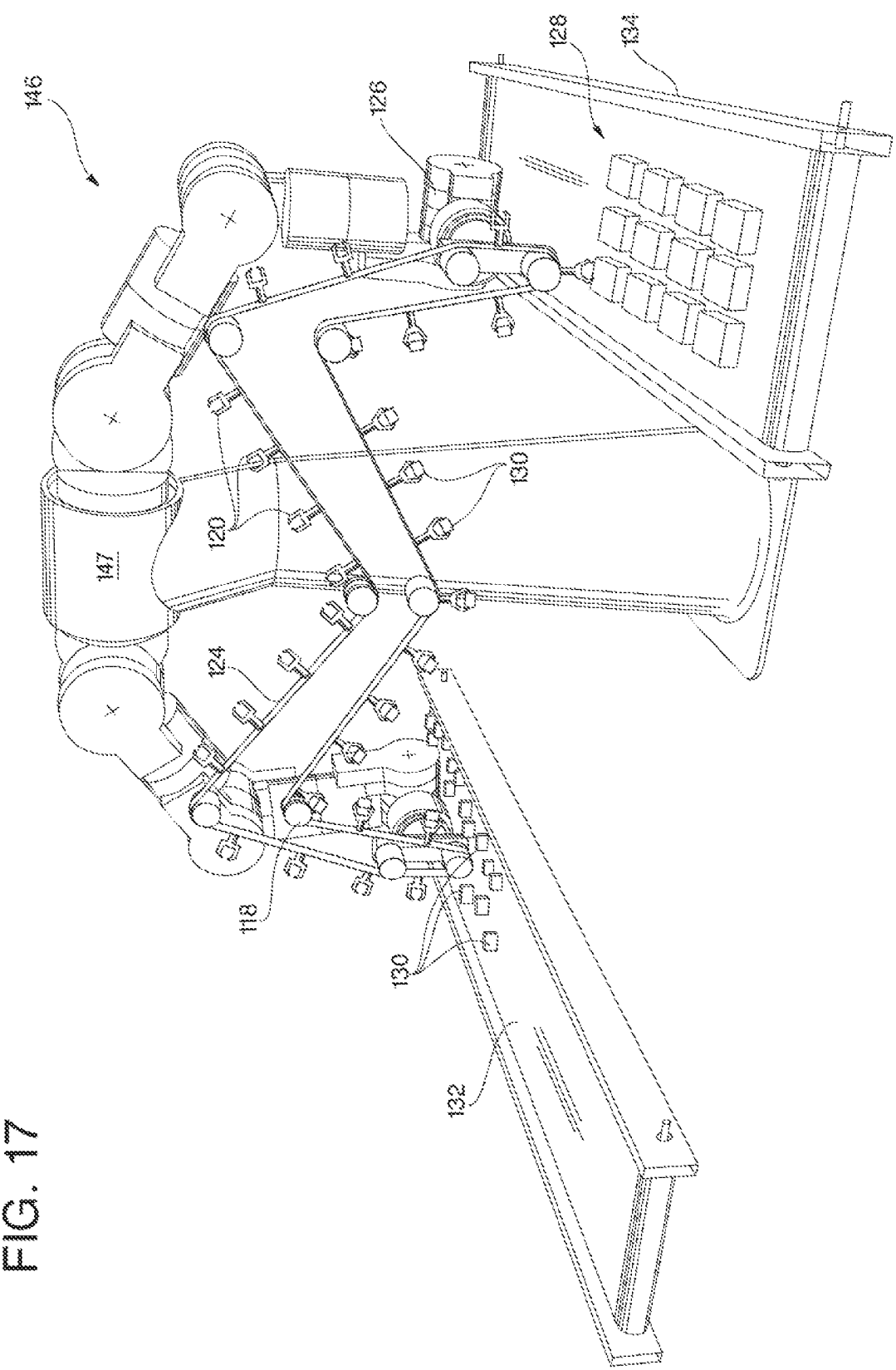
FIG. 17 is a simplified perspective view of a "pick-and-place" two-arm robot utilizing the product engager, transporter, and patterned depositor of FIG. 15.

FIG. 17 shows a simplified perspective view of a two-armed robot 147 pick-and-place machine 146 that employs a two-armed robot 147 to utilize the positioning guide 118, endless loop 124 having picker heads 120 and location guide 126 of FIG. 16 for moving the objects 130 from the first location 132 to a pattern 128 upon the second location 134.

The present disclosure 30 in its several described embodiments includes in common a product engager 32, a transporter 34 and a patterned depositor 36. The product engager 32 includes a first driver 46 for moving products 38 through the product engager 32 at a first product rate. The patterned depositor 36 includes a second driver 48 for moving the products 38 through the patterned depositor 36 at a second product delivery rate. The transporter 34 includes an adjustable-length buffer 50 that extends between the product engager 32 and the patterned depositor 36. The adjustable-length buffer 50 may include a flexibly linked product stream 52 (shown best in FIGS. 4 and 6) and/or an adjustable position conveyor 54, 70, 100, 124. By selectively varying a length of the transporter 34, the transporter 34 provides a variable rate of movement of the products 38 passing from the product engager 32 to the patterned depositor 36. The patterned depositor 36 selectively changes the second product delivery rate of the products 38 to be either greater than, less than or the same as the first product delivery rate of the product engager 32. This enables all embodiments of the present system 30 to thereby compensate for any temporary difference between the first product delivery rate of the product engager 32 and the rate of movement, of the products 38 passing from the product engager 32 along the transporter 34 to the patterned depositor 36.

The present disclosure also includes methods of using the described embodiments. An exemplary method of using the described embodiments includes driving the products 38 through the product, engager 32 at a first product delivery rate; driving the products 38 through the patterned depositor 36 at a second product delivery rate that is one of greater than, less than, and the same as the first product delivery rate; and, compensating for any temporary difference between the first product delivery rate and a rate of movement of the products 38 passing from the product engager 32 to the patterned depositor 36 by adjusting a distance the products 33 are transported between the product engager 32 and the patterned depositor 36.

While the present disclosure has been presented above with respect to the described and illustrated embodiments of the automated product engager, transporter and patterned depositor system, it is to be understood that the disclosure is not to be limited to those illustrations and described embodiments. Accordingly, reference should be made primarily to the following claims rather than the forgoing description to determine the scope of the disclosure.

What is claimed is:

1. An automated system (30) including a product engager (32), a transporter (34) and a patterned depositor (36) for engaging products (38) and transporting the products (38) from the product engager (32) to the patterned depositor (36) for depositing the products (38) in a pattern (40), the system (30) comprising:
   a. the product engager (32) including a first driver (46) for moving the products (38) through the product engager (32) to the transporter (34) at a first product delivery rate;
   b. the patterned depositor (36) including a second driver (48) for moving the products (38) through the patterned depositor (36) at a second product delivery rate;
   c. the transporter (34) including an adjustable-length buffer (50) extending between the product engager (32) and the patterned depositor (36), the adjustable-length buffer (50) including at least one of a flexibly linked product stream (52) and an adjustable position conveyor (54), for increasing and decreasing a length of the transporter (34) to thereby increase and decrease a distance the products (38) must travel between the product engager (32) and the patterned depositor (36); and,
   d. wherein the patterned depositor (36) is configured to selectively change the second product delivery rate of the products (38) moving through the patterned depositor (36) to be one of greater than, less than, and the same as the first product delivery rate, and wherein the transporter (34) is configured so that the length of the transporter (34) remains unchanged whenever the second product delivery rate of the patterned depositor (36) is the same as the first product delivery rate, so that the length of the transporter (34) increases whenever the second product delivery rate of the patterned depositor (36) is less than the first product delivery rate, and so that the length of the transporter (34) decreases whenever the second product delivery rate of the patterned depositor (36) is greater than the first product delivery rate.

2. The automated system (30) of claim 1 wherein the product engager (32) comprises a product bagging machine (56), the adjustable-length buffer (50) of the transporter (34) comprises a linked product stream (52), and the patterned depositor (36) is configured to cut the linked product stream (52) into separated products (38).

3. The automated system (30) of claim 1 wherein the product engager (32) comprises a product bagging machine (56), the adjustable-length buffer (50) of the transporter (34) comprises a linked product stream (52) on an adjustable position conveyor (54), and the patterned depositor (36) is configured to cut the linked product stream (52) into separated products (38).

4. The automated system (30) of claim 1 wherein the product engager (32) comprises a product bagging machine (56), the transporter (34) comprises an adjustable position conveyor (70) including a plurality of vertical walls (68) extending above and across the conveyor (70) in a direction perpendicular to a direction of travel of the conveyor (70) and the vertical walls (68) are configured so that a product (38) is positioned between two vertical walls (68) to restrict motion of the product (38) upon the conveyor (70).

5. The automated system (30) of claim 1 wherein the adjustable-length buffer (50) of the transporter (34) comprises an adjustable position conveyor (54, 70) configured to selectively alter a feed length (76) of the conveyor (70) by altering dimensions of curves of the feed length (76) in at least one of a vertical plane and a horizontal plane of the conveyor (70).

6. An automated system (30) including a product engager (32), a transporter (34) and a patterned depositor (36) for engaging products (38) and transporting the products (38) from the product engager (32) to the patterned depositor (36) for depositing the products (38) in a pattern (40), the system (30) comprising:
   a. the product engager (32) including a first driver (46) for moving the products (38) through the product engager (32) to the transporter (34) at a first product delivery rate;
   b. the patterned depositor (36) including a second driver (48) for moving the products (38) through the patterned depositor (36) at a second product delivery rate;
   c. the transporter (34) including an adjustable-length buffer (50) extending between the product engager (32) and the patterned depositor (36), the adjustable-length buffer (50) including at least one of a flexibly linked product stream (52) and an adjustable position conveyor (54), for providing a variable rate of movement of the products (38) passing from the product engager (32) to the patterned depositor (36);
   d. wherein the patterned depositor (36) is configured to selectively change the second product delivery rate of the products (38) moving through the patterned depositor (36) to be one of greater than, less than, and the same as the first product delivery rate, to thereby compensate for any temporary difference between the first product delivery rate and a rate of movement of the products (38) passing from the product engager (32) to the patterned depositor (36); and,
   e. wherein the product engager (32) comprises a case loader (98), the adjustable-length buffer (50) of the transporter (34) comprises an adjustable position conveyor (54, 70, 100), and the patterned depositor (36) comprises a palletizing machine (102), wherein a conveyor position adjuster (108) selectively positions the conveyor (100) to lengthen and shorten a feed length (116) of the conveyor (100) while simultaneously the conveyor position adjuster (108) positions the conveyor (100) to shorten and lengthen a return length (112) of the conveyor (100).

7. An automated system (30) including a product engager (32), a transporter (34) and a patterned depositor (36) for engaging products (38) and transporting the products (38) from the product engager (32) to the patterned depositor (36) for depositing the products (38) in a pattern (40), the system (30) comprising:
   a. the product engager (32) including a first driver (46) for moving the products (38) through the product engager (32) to the transporter (34) at a first product delivery rate;
   b. the patterned depositor (36) including a second driver (48) for moving the products (38) through the patterned depositor (36) at a second product delivery rate;
   c. the transporter (34) including an adjustable-length buffer (50) extending between the product engager (32) and the patterned depositor (36), the adjustable-length buffer (50) including at least one of a flexibly linked product stream (52) and an adjustable position conveyor (54), for providing a variable rate of movement of the products (38) passing from the product engager (32) to the patterned depositor (36);
   d. wherein the patterned depositor (36) is configured to selectively change the second product delivery rate of the products (38) moving through the patterned depositor (36) to be one of greater than, less than, and the same as the first product delivery rate, to thereby compensate for any temporary difference between the first product delivery rate and a rate of movement of the products (38) passing from the product engager (32) to the patterned depositor (36); and,
   e. wherein the product engager (32) comprises a position guide (118) for guiding picking heads (120) to pick objects (130) at a first location (132), the adjustable-length buffer (50) of the transporter (34) comprises a flexible endless loop (124) that moves the picker heads (120) secured to the endless loop (124) from the position guide (118), and the patterned depositor (36) comprises a location guide (126) adjacent a second location (134) for placing the picked objects (130) within a pattern (128) at the second location (134), and wherein position adjusters (138A, 138B, 138C, 138D, 138E, 138F) selectively position the endless loop (124) to lengthen and shorten a feed length (140) of the endless loop (124) while simultaneously the position adjusters (138A, 138B, 138C, 138D, 138E, 138F) move the endless loop (124) to shorten and lengthen a return length (144) of the endless loop (124).

\* \* \* \* \*